United States Patent [19]

Wheeler et al.

[11] Patent Number: 4,957,555
[45] Date of Patent: Sep. 18, 1990

[54] CEMENTING COMPOSITIONS AND METHOD

[75] Inventors: John G. Wheeler, Pipe Creek; Jose G. Garcia, San Antonio, both of Tex.

[73] Assignee: Capitol Aggregates, Inc, San Antonio, Tex.

[21] Appl. No.: 434,723

[22] Filed: Nov. 9, 1989

[51] Int. Cl.$^5$ .................... C04B 7/21/28; C04B 7/30
[52] U.S. Cl. .................... 106/716; 106/717; 106/814
[58] Field of Search .................... 106/90, 97

[56] References Cited

U.S. PATENT DOCUMENTS

| | | |
|---|---|---|
| Re. 26,597 | 6/1969 | Small et al. . |
| 2,880,096 | 3/1959 | Hurley . |
| 3,036,633 | 5/1962 | Mayhew . |
| 3,131,075 | 4/1964 | Brooks, Jr. . |
| 3,197,317 | 7/1965 | Patchen . |
| 3,234,035 | 2/1966 | Small et al. . |
| 3,328,180 | 6/1967 | Ban . |
| 3,376,146 | 4/1968 | Mitchell ................. 106/97 |
| 3,442,670 | 5/1969 | Parsons . |
| 3,503,767 | 3/1970 | Gaines et al. . |
| 3,519,449 | 7/1970 | Babcock . |
| 3,794,504 | 2/1974 | Babcock . |
| 3,890,157 | 6/1975 | Babcock . |
| 4,015,977 | 4/1977 | Crawford . |
| 4,043,828 | 8/1977 | Gaines ................. 106/97 |
| 4,045,237 | 8/1977 | Gaines et al. . |
| 4,069,870 | 1/1978 | Gallus . |
| 4,114,692 | 9/1978 | Gallus . |
| 4,142,909 | 3/1979 | Gaines . |
| 4,157,263 | 6/1979 | Gaines . |
| 4,200,153 | 4/1980 | Gallus . |
| 4,204,875 | 5/1980 | Szalavitz . |
| 4,235,291 | 11/1980 | Messenger . |
| 4,340,427 | 3/1980 | Sutton . |
| 4,391,329 | 5/1981 | Gallus . |
| 4,452,638 | 4/1983 | Gallos ................. 106/97 |
| 4,721,160 | 8/1985 | Parcevaux et al. . |

*Primary Examiner*—William R. Dixon, Jr.
*Assistant Examiner*—Alan A. Wright
*Attorney, Agent, or Firm*—Sigalos, Levine & Montgomery

[57] ABSTRACT

A cementing composition for forming a low density cement slurry comprising a hydraulic cement and shot coke.

16 Claims, No Drawings

CEMENTING COMPOSITIONS AND METHOD

BACKGROUND OF THE INVENTION

The instant invention is directed to cement compositions which can be used to form novel low density cement slurries giving hardened cements with high compressive strength. This invention is particularly suitable for use in cementing operations in subterranean wells, especially oil and gas wells.

It is often necessary in the drilling and treatment of wells extending from the surface into subterranean formations to utilize a cement composition for various purposes, such as primary cementing, squeeze cementing, and plugging back. More particularly, cements are used for primary cementing involving sealing the annulus between the well casing and the wall of the hole that is bored in forming the well. In such instance a cement slurry is formed and pumped into the confined space usually through the casing from the bottom of the well. Squeeze cementing is also utilized to cure defects that may occur in primary cementing or in making a repair if there has been some damage to the well in a particular location or in other remedial work such as cementing of perforations or of channels in back of the casing. Plugging back involves sealing of the lowest portion of a well.

In pumping the cement slurry, which usually has a density in excess of 15 lbs/gal., into the bore hole for such purposes, high hydrostatic heads are caused by the weight of the cement slurry and a high pumping pressure is required which often act to cause uncontrolled fracturing of formations through which the well is bored. Such high density cements and high pump pressures can also result in loss of cement into porous types of formations.

Recognizing the problems of high density cement slurries, efforts have been made to reduce the density below 15 lbs/gal., as by adding larger amounts of water to the slurry or by including other materials in the slurry which act to lower the density. However, it has been found that the addition of water, while lowering the density, does have the undesirable effect of lowering the compressive strength of the cement, when set, below desirable levels.

With respect to density-lowering additives, a large number of materials have been used such as bentonite, attapulgite, gilsonite, diatomaceous earth, expanded perlite, and certain types of particulate carbon additives such as ground anthracite coal, lignite coal, coal cokes and bituminous coal.

However, even with such additives, while densities lower than 15 lbs/gal. can be obtained in some instances, satisfactory results are still not realized because of the deficiencies of these additives. For example, as to bentonite, if used in a proportion sufficient to lower density to the levels desired it forms a gelatinous mass that is substantially unpumpable. With gilsonite there is the high cost and softness which results in fast setting to give initial strength, but not adequate strength over time; i.e., after seven days. Others of the additives require a higher water demand in order to be pumpable and thus there is again the problem of unsatisfactory compressive strength. These additives cannot be added in sufficient quantities to lower the density to a satisfactory level and to be able to obtain rapid strength development as required in subterranean wells particularly in cementing of oil and gas wells. Also, there is the problem of high cost with many of the additives, such as the coals and the fact that coals contain high levels of volatiles that can decrease the strength of the set cement over time. Also, there is none that can give the properties desired at a density of 11 lbs/gal.

Thus, there remains the problem of obtaining an inexpensive, lightweight cement composition that can be used to form a low density cement slurry, one as low as about 11 lbs/gal. that can be readily pumped at low pump pressures to avoid fracturing of underground formations, but that will rapidly give adequate compressive strength when set even at densities as low as about 11 lbs/gal. In this latter regard, for example, the regulations of the Texas Railroad Commission require that the cement, when utilized in shallow oil and gas wells, must have a compressive strength of 250 psi at 80° in 24 hours.

In addition to the foregoing requirements, because of the large volumes of materials utilized, it is also necessary to use an inexpensive additive to make the lightweight cement in order to make it economically feasible to use the same.

SUMMARY OF THE INVENTION

The present invention overcomes the problems of the prior art and provides inexpensive low density cementing compositions which will rapidly set to give high compressive strength cements, which low density cements are also suitable for use as structural cements.

Briefly stated, the present invention comprises a dry cementing composition for forming a low density comprising a pulverulent hydraulic cement and shot coke particles, particularly one for forming a low density cement slurry for use in cementing wells.

The invention also comprises a low density cement slurry, particularly for use in cementing subterreanan wells, comprising a hydraulic cement, shot coke, and an aqueous fluid, the relative proportions thereof being such as to give a slurry density of about 13 pounds per gallon or less, preferably about 12 lbs/gal., or less.

The invention also comprises the method of cementing a confined space in a subterranean well comprising introducing into said confined space a low density cement slurry comprising a hydraulic cement, shot coke, and aqueous fluid and having a slurry density of about 13 pounds per gallon or less and permitting said slurry to harden. The invention is particularly suitable for shallow wells having a temperature of about 200° F. or less.

DETAILED DESCRIPTION

The essential components of the present cementing composition are, when in the dry form, the hydraulic cement and shot coke and when a slurry is to be formed the addition of an aqueous fluid.

As to the hydraulic cement it can be any pulverulent hydraulic cement which is utilized for cementing subterreanan wells. The most suitable cements are those having a high specific surface area; i.e., about 3600 sq.cm/gm and above as measured by the Blaine permeability apparatus and a tricalcium aluminate content of at least about 6.5% and higher. There are a number of such cements including those specified by the American Petroleum Institute (API), known as "A.P.I. cements" which are utilized for cementing operations in wells. In addition thereto, one can utilize any other hydraulic cement such as portland cements, alumina cements, regulated set cements and the like, such as ASTM Type I, II, and III cements, with Type III cement being preferred. Type III cement has a specific surface area of greater than 5200 sq.cm/gm and a tricalcium aluminate content of about 11%.

As to the shot coke, it is essential that it be utilized in order to obtain the necessary low density and high compressive strength. Shot coke is a form of delayed coke. Delayed coke is a particular type of petroleum coke which contains three types of coke, needle coke, sponge coke and shot coke. Certain types of delayed coke have been used as expansive (shrinkage compensating) agents in certain cementitious fast-setting compositions to be used as concretes, mortar, grout, and the like, to give a predetermined degree of expansion. Such delayed coke is used in minor amounts and is an open celled material which must preferentially adsorb water and discharge entrapped gas; i.e., sponge coke. Shot coke derives its name from the distinctive appearance of substantially round pellets resembling shot. Shot coke has essentially the same density as needle coke and sponge coke, but it is a harder material usually less than 35 on the Hardgrove Grindability Index. It is also a relatively inert material and as such does not react in any way so as to be detrimental to the cement either in the slurry or once the slurry hardens. Its hardness also enables it to withstand the temperatures and pressures present in wells. Also, shot coke does not adsorb water even when aqueous slurries containing the same are put under pressure.

While any size shot coke can be utilized, it is particularly suitable to use shot coke that ranges in size from about −8 to +200 mesh (Tyler), preferably from −10 to +100 mesh and most suitably, −10 to +40 mesh. It will be evident that larger size shot coke can be ground in conventional grinding apparatus to the particular particle sizing desired.

The aqueous fluid is preferably water although any other aqueous fluid used in forming cement slurries for wells can be utilized.

While the essential materials are as noted above, it will be evident that other additives ordinarily added to cements used in wells can be utilized. These materials are classified as accelerators, retarders, loss-circulation control agents, filtration control agents, and friction reducers. These materials are added in their usual amounts and for their usual purposes. Minor amounts of other light-weight additives can also be used so long as they do not adversely affect the strength of the cement or the ability to form easily pumpable slurries of low density.

Thus, for example, accelerators can be used in the instant invention if high water percentages are utilized by well operators. Such high water use tends to lower the density of the slurries, but also tends to lower the compressive strength as noted above. Since operators desire to use slurry density as close as possible to density of the pumping mud this results in lower compressive strength. Therefore, accelerators can be added to increase compressive strength of the resultant cement. Any material ordinarily used for accelerating cement can be utilized. Examples are chloride salts such as calcium, ammonium, iron, copper, and magnesium chloride as well as sodium silicate and sodium aluminate.

Also, when well temperatures are about 135° F. or above, conventional retarders can be used to slow the reaction rate.

As to the proportions, the amounts of cement and shot coke utilized will vary dependent upon the particular specific density desired, the particular cement used, and, to a limited extent, the particle size of the shot coke. However, by routine experimentation, the optimum proportions of particular cement to be utilized and the amount and particle size of shot coke can be readily determined and adjusted, together with the amount of water to give cement slurries having a density of 13 pounds/gallon or less, preferably about 11 pounds/gallon which will rapidly harden to give a compressive strength of over 250 psi at 80° in 24 hours. The compressive strength is measured in accordance with API Specification 10, Section 7.

Proportions can range, in the dry mix, from about 33 to 67 parts by weight hydraulic cement and, correspondingly 67 to 33 parts by weight of shot coke, but it is preferred that the mix can contain at least 50 parts by weight of the shot coke.

By way of illustration, operable ranges of cement, if one is utilizing a Type III portland cement, can be from about 40 to 50 parts by weight of the portland cement and correspondingly 60 to 50 parts by weight of shot coke. The amount of water that can be added can range from about 20 to 65 parts by weight of the aqueous cement slurry. This range of added water can produce slurries between 11 to 13 pounds per gallon density. A preferred slurry consists essentially of about 29 to 31 parts by weight ASTM Type III portland cement, about 29 to 46 parts by weight shot coke having a particle size of −10 to +40 mesh (Tyler) and about 23 to 42 parts by weight water. Most suitably, the slurry contains 32 parts by weight of the cement, 42 parts by weight of the shot coke, and 26 parts by weight water.

When larger amounts of water are utilized; i.e., above about 45 parts by weight, then, as noted above accelerators should be added to give adequate strength.

The instant invention is particularly suitable for cementing operations in oil and gas wells, more particularly, cementing casing in oil and gas wells and will be discussed in connection therewith. In such primary cementing, the slurry is pumped into the annulus between the bore hole and the casing through the bottom of the bore hole. The low density and the high compressive strength make the instant low density cement slurries extremely desirable since they result in the easy placement of the cement at low pump pressures and prevent any uncontrolled fracturing of the formations through which the bore hole passes. Because of its ability to perform satisfactorily at low temperatures, the instant invention is also particularly suitable in shallow wells.

The present cement can give a compressive strength of above about 600 psi at 80° F. in 24 hours and strengths of about 1,000 psi and higher in 7 days at 100° F. as measured by API Spec. 10, Sec. 7.

The invention will be further described in connection with the following specific examples which are set forth for purposes of illustration only. In these examples the compressive strengths were measured in accord with API Spec. 10, Sec. 7, the mesh sizes are Tyler, and proportions are in parts by weight unless expressly stated to the contrary.

EXAMPLE 1

A slurry was formed by admixing 32 parts ASTM Type III portland cement, 42 parts shot coke having a particle size range of −10 to +40 mesh, and 26 parts water. The resultant slurry had a density of 12 lbs/gal.

The resulting slurry was then permitted to harden and tested to determine its compressive strength over a period of time. The results are as follows:

| Compressive Strength | |
|---|---|
| 80° F., 24 hrs | 1,225 psi |
| 100° F., 7 days | 3,200 psi |

EXAMPLE 2

A slurry having a density of 13.3 lbs/gal. was prepared by admixing 47 parts ASTM Type III portland cement, 25 parts −10 to +40 mesh shot coke, and 28 parts water.

The slurry was permitted to harden and the compressive strength measured. The results were as follows:

| Compressive Strength | |
|---|---|
| 80° F., 24 hrs | 3,010 psi |
| 100° F., 7 days | 4,055 psi |

EXAMPLE 3

(Comparative)

A slurry having a density of 12 lbs/gal. was prepared by admixing 43 parts ASTM Type III portland cement, 21 parts −4 to +200 mesh gilsonite, and 36 parts water.

The slurry was permitted to harden and the compressive strength measured. The results were as follows:

| Compressive Strength | |
|---|---|
| 80° F., 24 hrs | 895 psi |
| 100° F., 7 days | 2,090 psi |

The gilsonite is expensive and softens at about 300° F. which causes pumping problems. Also, the density cannot be lowered to 11 and still maintain the necessary compressive strength.

EXAMPLE 4

(Comparative)

A slurry having a density of 12 lbs/gal. was prepared by admixing 31 parts ASTM Type III portland cement, 40 parts −10 to +40 mesh bituminous coal, and 29 parts water.

The slurry was permitted to harden and the compressive strength measured. The results were as follows:

| Compressive Strength | |
|---|---|
| 80° F., 24 hrs | 790 psi |
| 100° F., 7 days | 955 psi |

EXAMPLE 5

A slurry having a density of 12 lbs/gal. was prepared by admixing 32 parts ASTM Type I portland cement, 42 parts of −10 to +40 mesh shot coke, and 26 parts water.

The slurry was permitted to harden and the compressive strength measured. The results were as follows:

| Compressive Strength | |
|---|---|
| 80° F., 24 hrs | 600 psi |
| 100° F., 7 days | 2,620 psi |

EXAMPLE 6

A slurry having a density of 12 lbs/gal. was prepared by admixing 32 parts ASTM Type II portland cement, 42 parts −10 to +40 mesh shot coke, and 26 parts water.

The slurry was permitted to harden and the compressive strength measured. The results were as follows:

| Compressive Strength | |
|---|---|
| 80° F., 24 hrs | 445 psi |
| 100° F., 7 days | 2,295 psi |

EXAMPLE 7

(Comparative)

A slurry having a density of 12 lbs/gal. was prepared by admixing 35 parts ASTM Type III portland cement, 12 parts diatomaceous earth, (about 11 mesh (Tyler)) and 53 parts water.

The slurry was permitted to harden and the compressive strength measured. The results were as follows:

| Compressive Strength | |
|---|---|
| 80° F., 24 hrs | 270 psi |
| 100° F., 7 days | 855 psi |

The diatomaceous earth is costly and the density cannot be reduced to 11 and yet maintain the necessary strength.

EXAMPLE 8

(Comparative)

A slurry having a density of 12.6 lbs/gal. was prepared by admixing 35 parts ASTM Type III portland cement, 12 parts fly ash, (60%−325 mesh) and 53 parts water.

The slurry was permitted to harden and the compressive strength measured. The results were as follows:

| Compressive Strength | |
|---|---|
| 80° F., 24 hrs | 230 psi |
| 100° F., 14 days | 580 psi |

EXAMPLE 9

(Comparative)

A slurry having a density of 12.1 lbs/gal. was prepared by admixing 36 parts regulated set cement, 13 parts fly ash, (60%−325 mesh) and 51 parts water.

The slurry was permitted to harden and the compressive strength measured. The results were as follows:

| Comparative Strength | |
|---|---|
| 80° F., 24 hrs | less than 250 psi |

| Comparative Strength | |
|---|---|
| 100° F., 7 days | 465 psi |

EXAMPLE 10

A slurry having a density of 12 lbs/gal. was prepared by admixing 26 parts regulated set cement, 39 parts −10 to +40 mesh shot coke, and 35 parts water.

The slurry was permitted to harden and the compressive strength measured. The results were as follows:

Comparative Strength

| Comparative Strength | |
|---|---|
| 80° F., 24 hrs | 660 psi |
| 120° F., 7 days | 1,350 psi |

EXAMPLE 11

A slurry having a density of 11.8 lbs/gal. was prepared by admixing 26 parts ASTM Type III portland cement, 53 parts −10 to +40 mesh shot coke, and 21 parts water.

The slurry was permitted to harden and the compressive strength measured. The results were as follows:

| Comparative Strength | |
|---|---|
| 80° F., 24 hrs | 1,626 psi |
| 100° F., 7 days | 2,975 psi |

EXAMPLE 12

A slurry having a density of 12 lbs/gal. was prepared by admixing equal parts of ASTM Type III portland cement, −10 to +40 mesh shot coke, and water.

The slurry was permitted to harden and the compressive strength measured. The results were as follows:

| Comparative Strength | |
|---|---|
| 80° F., 24 hrs | 655 psi |
| 100° F., 7 days | 1,890 psi |

EXAMPLE 13

A slurry having a density of 11.2 lbs/gal. was prepared by admixing 27 parts ASTM Type III portland cement, 35 parts −10 to +40 mesh shot coke, and 38 parts water.

The slurry was permitted to harden and the compressive strength measured. The results were as follows:

| Compressive Strength | |
|---|---|
| 80° F., 24 hrs | 265 psi |
| 100° F., 7 days | 735 psi |

The present cementing composition and slurries are not only particularly suitable for cementing wells, but they are also suitable for use as structural cements where low density cements with high compressive strengths are required or desired.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed:

1. A cementing composition for forming a low density cement slurry comprising, for each 100 parts by weight, about 33 to 67 parts by weight of a pulverulent hydraulic cement and about 67 to 33 parts by weight of shot coke particles having a particle size of from about −8 to +200 mesh (Tyler) such that when admixed with water it will form a slurry having a density of about 13 pounds/gallon or less.

2. The cementing composition of claim 1, wherein the hydraulic cement is a portland cement having a specific surface area of at least about 3600 sq.cm/gm and a tricalcium aluminate content of at least about 6.5% by weight.

3. The cementing composition of claim 2, wherein the portland cement is an ASTM Type III portland cement and the proportions are from about 40 to 50 parts by weight cement and about 60 to 50 parts by weight shot coke.

4. The cementing composition of claim 1, 2, or 3 wherein the hydraulic cement is an ASTM Type III portland cement and the shot coke has a particle size of from about −10 to +40 mesh (Tyler).

5. The cementing composition of claim 1, 2, or 3 for use in cementing in subterranean wells wherein said composition consists essentially of, for each 100 parts by weight thereof, 40 to 50 parts by weight of an ASTM Type III portland cement and, correspondingly, 60 to 50 parts by weight of shot coke having a particle size of from about −10 to +40 mesh (Tyler).

6. A low density cement slurry comprising a hydraulic cement, shot coke having a particle size of from −8 to +200 mesh (Tyler), and an aqueous fluid, the relative proportions thereof being sufficient to give a slurry density of about 13 lbs/gal. or less and a compressive strength of at least 250 psi at 80° F. in 24 hours when measured by API Spec. 10, Sec. 7.

7. The low density slurry of claim 6, wherein the hydraulic cement is a portland cement having a specific surface area of at least about 3600 sq.cm/gm and a tricalcium aluminate content of at least about 6.5% by weight.

8. The low density slurry of claim 7, wherein the portland cement is an ASTM Type III portland cement.

9. The low density slurry of claim 6, 7, or 8 wherein the hydraulic cement is an ASTM Type III portland cement and the shot coke has a particle size of from about −10 to +40 mesh (Tyler).

10. The cement slurry of claim 6, 7, or 8 for use in cementing in subterranean wells wherein the slurry consists essentially of, for each 100 parts by weight thereof, about 29 to 31 parts by weight of ASTM Type III portland cement, about 29 to 46 parts by weight of shot coke having a particle size of about −10 to +40 mesh (Tyler), and about 23 to 42 parts by weight water.

11. The method of cementing in a well comprising introducing into said well in a low density cement slurry comprising a hydraulic cement, shot coke having a particle size of from about −8 to +200 mesh (Tyler), and an aqueous fluid, the relative proportions thereof being sufficient to give a slurry density of about 12 lbs/gal. or less and a compressive strength of at least about 250 psi at 80° F. in 24 hours when measured by API Spec. 10, Sec. 7, and permitting said slurry to harden.

12. The method of claim 11, wherein the hydraulic cement is a portland cement having a specific surface area of at least about 3600 sq.cm/gm and a tricalcium aluminate content of at least about 6.5% by weight.

13. The method of claim 12, wherein the portland cement is an ASTM Type III portland cement.

14. The method of claims 11, 12, or 13 wherein the hydraulic cement is an ASTM Type III portland cement and the shot coke has a particle size of from about −10 to +40 mesh (Tyler).

15. The method of claims 11, 12, or 13 wherein said well is a well having a temperature of about 200° F. or less.

16. The method of claims 11, 12, or 13 wherein the cementing is carried out in an annulus between an oil or gas well casing and the bore hole and the slurry is pumped through into the bottom of the well into said annulus, said cement slurry having a density of about 12 lbs/gal. or less and consisting essentially of, for each 100 parts by weight thereof, 29 to 31 parts by weight ASTM Type III portland cement, 29 to 46 parts by weight shot coke having a particle size of about −10 to +40 mesh (Tyler), and 23 to 42 parts by weight water.

* * * * *